A. F. Ward
Telegraphing by Colors
N° 34,079. Patented Jan. 7, 1862.
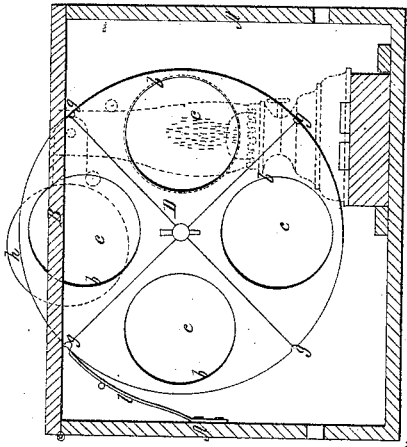
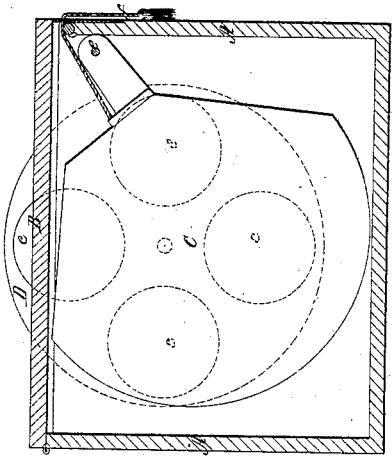
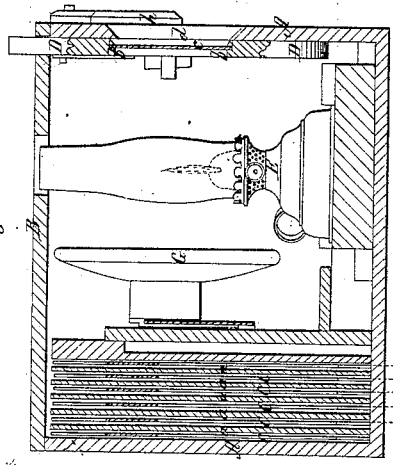
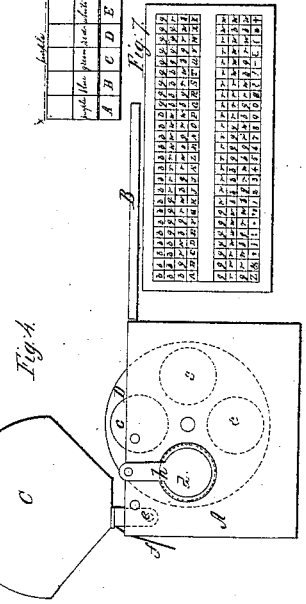

UNITED STATES PATENT OFFICE.

ASAHEL F. WARD, OF PHILADELPHIA, PENNSYLVANIA.

IMPROVEMENT IN TELEGRAPHING BY COLORS.

Specification forming part of Letters Patent No. 34,079, dated January 7, 1862.

*To all whom it may concern:*

Be it known that I, ASAHEL F. WARD, of the city of Philadelphia, in the county of Philadelphia and State of Pennsylvania, have invented a new and Improved System of Telegraphing by Colors; and I do hereby declare that the following is a full, clear, and exact description of the same, reference being had to the accompanying drawings, forming part of this specification.

To enable others to apply my invention to use, I will proceed first to describe the apparatus above mentioned, and then to explain as briefly as possible the system on which the alphabet, vocabulary, or code of signals and the keys for explaining the same are constructed.

In the accompanying drawings, Figure 1 is a vertical section of the apparatus taken in a plane at right angles to the planes in which the colored signal devices are exhibited. Figs. 2 and 3 are vertical sections parallel with the planes in which the said devices are exhibited, Fig. 2 showing the devices for day telegraphing, and Fig. 3 the devices for night telegraphing. Fig. 4 is a front view of the apparatus on a smaller scale than Figs. 1, 2, and 3.

Similar letters of reference indicate corresponding parts in these figures.

A is a box of parallelopipedal form, with a hinged lid B at the top. In the back part of this box there are arranged parallel with each other and in separate compartments $a\ a$ a series of flat fan-like plates $c\ c$, of different colors, which can be raised one at a time above the top of the box, and which constitute the devices for day telegraphing; and in the front part of the said box is an upright rotating disk D of wood or metal, which has a number of equidistant circular openings $b\ b$ fitted with glasses $c\ c$ of different colors, and which constitutes the device for night telegraphing, the said disk being so arranged that either of the colored glasses $c\ c$ may be presented between the light of a lamp E, arranged within the box behind the said disk, and an opening $d$ in the front of the box.

Any number of colors that admits of their being clearly distinguished from each other may be used either in day or night telegraphing. I propose generally in day telegraphing to use six colors—viz., black, blue, green, red, white, and yellow—and each of these colors is represented in the apparatus shown by one of the plates $c\ c$. These plates are all arranged to swing on the same fixed shaft or axle $e$, and drop into their several compartments $a\ a$ and entirely within the box by gravitation; but each can be separately raised above the top of the box and exposed to view in the manner shown by the red plate in Fig. 4 by pulling a string $f$, which is attached to it and which protrudes through a suitable opening in one side of the box, each plate having such a string attached, and each string being of the color of its respective plate or having at its outer extremity some attachment of the same color to distinguish it and prevent the operator from mistaking the strings one for another. The said plates C C may work through slits in the top or lid of the box, or the whole or a portion of the lid may be opened when it is desired to set the apparatus in operation. For the night-signals I propose only to use four colors—viz., blue, green, red, and white—each of which is represented by one of the glasses. The disk D projects upward through a slot in the lid or top of the box, and may be rotated by the operator applying his hand to the so projecting part or by the application of a crank or other suitable mechanical device, and it is so colored that the part of it which at any time projects through the top of the box within view of the operator stationed behind it is of the same color as the glass which is at the same time visible through the opening $d$ in the front of the box, so that the operator, though he cannot see the glasses, can always know their positions. A spring friction-pawl $l$ is applied to act on the periphery of the disk in such a manner as to prevent it from moving too easily from any position, but to lock it more securely by entering one of a series of notches $g\ g$, when any one of the colored glasses is directly opposite the opening $d$; but the tooth or point of the said pawl is so rounded as to permit the notches to pass it when sufficient force is applied to turn the disk. The opening $d$ in the case is furnished with a shutter $h$, which can be closed and opened at the pleasure of the operator. The lamp E has a reflector G placed behind it to concentrate its light upon whichever one of the glasses c c is presented opposite the opening d.

In the use of the six colors, as exemplified by the plates C C, I can produce all the letters of the alphabet, the numerals, and a signal for the spaces between words by means of two colors or two exhibitions of one color for each letter, as shown by the colored key, Fig. 5, in which the letters and numerals are all represented with the two colors or exhibitions of color used to produce them, the alphabet commencing at the left-hand end of the key. The letter A is produced by two exhibitions of black; B, by exhibiting first black and then blue; C, by black and green, and so on through the alphabet and the numerals 1 to 9, inclusive, the space-sign being also obtained without using more than two colors—viz., white, white. Two exhibitions of green express both the letter O and the numeral 0.

In the use of the four colors, as exemplified by the colored glasses c c, I can produce all the letters of the alphabet, the numerals, and several other signs useful in telegraphing by means of three colors or three exhibitions of color for each letter, numeral, or sign, as shown by the colored key, Fig. 6, in which the letters, numerals, and signs are all represented with the several colors or exhibitions of color used to produce them. Thus the letter A is produced by three exhibitions of blue, B by two exhibitions of blue and one of green, C by two of blue and one of red, and so on as indicated in the key. The repeated exhibitions of the same color can be made by closing and reopening the shutter h.

For convenient printing of the two keys on opposite sides of a small card for the pocket, as illustrated by Figs. 7 and 8, I propose to use the letters "bk" for black, "b" for blue, "g" for green, "w" for white, and "y" for yellow, printed in small square ruled spaces corresponding with the squares of colors in Figs. 5 and 6. Fig. 7 is the day alphabet-key on one side of the card, and Fig. 8 the night alphabet-key on the opposite side.

It is obvious that by increasing the whole number of colors used and the number of colors or exhibitions used to produce the signs that the system may be extended almost indefinitely to the telegraphing of words and sentences. Thus by the use of six colors with three exhibitions for each sign two hundred and sixteen combinations may be made for the production of an alphabet, numerals, and words or sentences; and by the use of the same number of colors with four exhibitions for each sign one thousand two hundred and ninety-six combinations may be made, and the number of words and sentences increased in a corresponding manner.

A simple alphabet may be produced by three colors only, as shown by the diagram, Fig. 9, the colors represented being red, white, and blue.

This system of signaling by colors may be carried out by means of flags, fire-works, or any colored objects; but the apparatus represented constitutes a simple and convenient means of applying it for night or day telegraphing at pleasure.

I do not claim to be the first inventor of telegraphing by colors; but

What I claim as my invention, and desire to secure by Letters Patent, is—

The use of a table or key composed of squares arranged as set forth, for the purpose specified.

A. F. WARD.

Witnesses:
   I. R. SHANKLAND,
   BASIL SEWALL.